Jan. 7, 1930.  J. GILTSCH ET AL  1,742,764
VEHICLE DOOR LATCH
Filed March 7, 1928
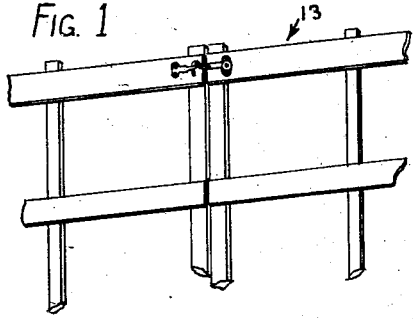
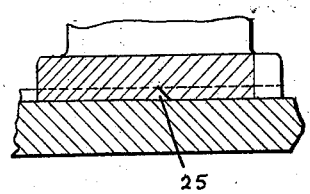
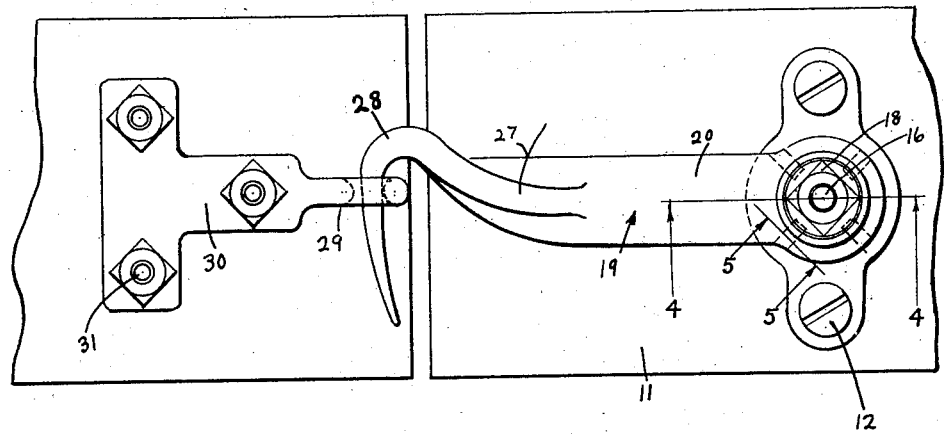
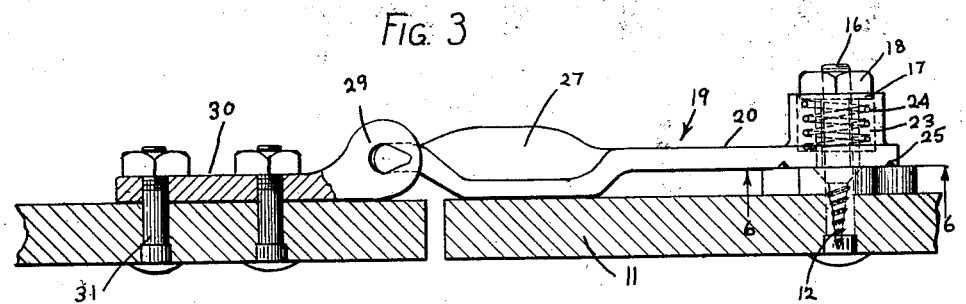
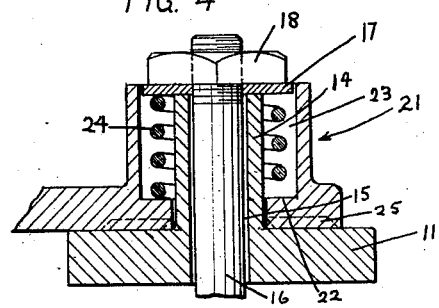
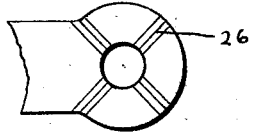
INVENTORS
JOHN GILTSCH
MARTIN GILTSCH
HENRY SCHORSCH
JOHN D. GILTSCH
BY Hazard and Miller
ATTORNEYS Patented Jan. 7, 1930

1,742,764

UNITED STATES PATENT OFFICE

JOHN GILTSCH, MARTIN GILTSCH, HENRY SCHORSCH, AND JOHN D. GILTSCH, OF LOS ANGELES, CALIFORNIA, ASSIGNORS TO STANDARD CARRIAGE WORKS, INC., OF LOS ANGELES, CALIFORNIA, A CORPORATION OF CALIFORNIA

VEHICLE DOOR LATCH

Application filed March 7, 1928. Serial No. 259,741.

Our invention is a vehicle door latch particularly adapted for the side doors or frames of box-like trucks, and for the rear door, the latch being of the type to remain either closed or open.

An object of our invention is the construction of a vehicle door latch which when closed is positively retained in such closed position, such that the hook part of the latch cannot jump out of the eye. To obtain this effect, we utilize a spring which, acting on the hook part of the latch, holds such hook in proper relation to interengage ribs and grooves in the latch and the supporting structure on which it is mounted. Therefore, when the ribs and grooves engage, the latch is either in locked or open position in accordance with the tilting of the hook in reference to the eye with which it co-operates.

In constructing our invention we preferably use a base plate secured to one frame of the vehicle, this plate having radial ribs and having a bolt hole therethrough. Mounted on the base plate there is a hook arm having a hook at the end, this arm having a hub rotating on a sleeve of the base plate. A spring is mounted in a socket between the hub and the sleeve and bears against a washer secured to a bolt extending through the base plate, and the sleeve, thereby giving a constant pressure thrusting the hook arm against the base plate. This hook arm has radial grooves adapted to interlock with the ribs on the base plate. The hook of the hook arm interengages with an eye secured to the other part of the vehicle which it is desired to latch together.

Our invention is illustrated in the accompanying drawings, in which:

Figure 1 is a perspective view of a vehicle frame with a latch secured thereto.

Fig. 2 is a side elevation of the latch taken in the direction of the arrow 2 of Fig. 3.

Fig. 3 is a bottom view of the latch taken in the direction of the arrow 3 of Fig. 2, that is, looking upwardly.

Fig. 4 is a horizontal detail section on the line 4—4 of Fig. 2 through part of the base plate, the sleeve, the hub and the spring mounted in the hub.

Fig. 5 is a detail section on the line 5—5 of Fig. 2 in the direction of the arrows, showing the interengaging radial ribs and grooves.

Fig. 6 is a detail elevational view taken on the line 6—6 of Fig. 3 in the direction of the arrows showing the inside face of the hook arm and the radial ribs mounted thereon.

In our invention we employ a base plate 11 which may be secured by screws 12 to a structural part of the vehicle, such as side frames, designated by the numeral 13. This base plate has a sleeve 14 extending outwardly therefrom, there being an opening 15 through the sleeve for a carriage bolt 16 or the like. This carriage bolt has a washer 17 and a nut 18.

The hook arm 19 has a flat strip end 20 with a hub 21 extending laterally to one side thereof; this hub has an internal shoulder 22. The hub, therefore, has a recess 23 between the portion of the hub above the shoulder and the sleeve 14. In this recess there is a compression coiled spring 24 which bears against the washer 17 and the shoulder 22. On the upper surface of the base plate there are a series of radially extending ribs 25 which are adapted to engage with a series of radial grooves 26 formed on the under surface 20 of the hook arm 19.

This hook arm has a twisted section 27 terminating in the hook proper 28, this latter engaging an eye 29 formed integral with a strap 30, this strap being secured to part of the frame 13 by carriage bolts 31 or the like.

In this construction when the hook 28 engages in the eye 29, the parts are so positioned that the radial ribs 25 fit in the radial grooves 26 of the hook arm and such hook arm is pressed tightly against the base plate 11. This interengagement of the ribs and the grooves prevents the hook of the latch from jolting out of the eye during the travel of the vehicle. However, when it is desired to unlatch the different elements of the frame, it is merely necessary to pull upwardly on the hook arm and this causes the compression of the spring, the ribs functioning as a cam and lifting the hook arm slightly away from the base plate. This hook arm may then be tilted to another position where the ribs and grooves interengage, and hence the device may be left unlatched.

Various changes may be made in the principles of our invention without departing from the spirit thereof, as set forth in the description, drawings and claims.

We claim:

1. A latch comprising in combination a base plate having means to secure same to a vehicle frame, a sleeve extending outwardly from the plate, a hook arm having a hub with a socket, a bolt extending through the plate and the sleeve having a washer, a spring surrounding the sleeve bearing against the washer and the bottom of the socket, the base plate and hub having a plurality of interengaging radial ribs and grooves to hold the hook arm in a plurality of adjusted positions.

2. A latch comprising in combination a base plate having means to secure same to the vehicle frame, a sleeve formed integral with the plate and extending laterally therefrom, said plate having a flat face with a plurality of radial ribs, a hook arm having a hub with a flat face with radial grooves therein to engage the flat face and the ribs of the base plate, said hub having a socket with an annular shoulder at the base thereof, a bolt extending through the base plate and sleeve and having a nut and washer thereon, a spring mounted in the socket and surrounding the sleeve engaging the washer and the shoulder, and a hook on the end of the hook arm.

In testimony whereof we have signed our names to this specification

JOHN GILTSCH.
MARTIN GILTSCH.
HENRY SCHORSCH.
JOHN D. GILTSCH.